(12) United States Patent
Giuliani

(10) Patent No.: US 12,013,122 B2
(45) Date of Patent: Jun. 18, 2024

(54) METHOD AND DEVICE FOR RECURSIVE SEQUENTIAL COMBUSTION

(71) Applicant: COMBUSTION BAY ONE E.U., Graz (AT)

(72) Inventor: Fabrice Louis Michel Giuliani, Graz (AT)

(73) Assignee: Combustion Bay One E.U., Graz (AT)

( * ) Notice: Subject to any disclaimer, the term of this patent is extended or adjusted under 35 U.S.C. 154(b) by 0 days.

(21) Appl. No.: 18/247,671

(22) PCT Filed: Aug. 4, 2021

(86) PCT No.: PCT/AT2021/060270
§ 371 (c)(1),
(2) Date: Apr. 3, 2023

(87) PCT Pub. No.: WO2022/067359
PCT Pub. Date: Apr. 7, 2022

(65) Prior Publication Data
US 2024/0019125 A1  Jan. 18, 2024

(30) Foreign Application Priority Data
Oct. 1, 2020 (AT) ................ A 50844/2020

(51) Int. Cl.
*F23R 3/42* (2006.01)
*F23R 3/02* (2006.01)
(Continued)

(52) U.S. Cl.
CPC ............. *F23R 3/425* (2013.01); *F23R 3/02* (2013.01); *F23R 3/12* (2013.01); *F23R 3/286* (2013.01);
(Continued)

(58) Field of Classification Search
CPC ....... F02C 3/34; F23R 3/02; F23R 3/12; F23R 3/18; F23R 3/20; F23R 3/286; F23R 3/42;
(Continued)

(56) References Cited

U.S. PATENT DOCUMENTS 5,025,622 A * 6/1991 Melconian ............... F23R 3/50
60/39.464
5,946,902 A    9/1999 Schuetz et al.
(Continued)

FOREIGN PATENT DOCUMENTS

DE         2301865 A1    7/1974
DE    102010023816 A1   12/2011

*Primary Examiner* — Scott J Walthour
(74) *Attorney, Agent, or Firm* — Laurence A. Greenberg; Werner H. Stemer; Ralph E. Locher

(57) ABSTRACT

A method and a device provide a uniform recursive sequential combustion of fuel and oxidizing agents within a thermal system having a continuous flow. Compressed fresh air is directed through the combustion chamber along a primary flow direction. A proportion of the fresh air is supplied to a burner by way of a burner entry and in the burner is combusted with fuel and exits the burner as exhaust gas. The burner is disposed at an angle in relation to the primary flow direction such that part of the exhaust gas exiting the burner exit is imparted a tangential flow in relation to the primary flow direction and circulates in the combustion chamber and enters the burner entry of a downstream burner so as to be mixed with the fresh air flowing into the downstream burner such that a recursive sequential combustion is achieved.

18 Claims, 7 Drawing Sheets

(51) Int. Cl.
*F23R 3/12* (2006.01)
*F23R 3/28* (2006.01)
*F23R 3/50* (2006.01)
*F23R 3/52* (2006.01)

(52) U.S. Cl.
CPC .............. *F23R 3/50* (2013.01); *F23R 3/52* (2013.01); *F23R 2900/03341* (2013.01)

(58) Field of Classification Search
CPC .... F23R 3/425; F23R 3/52; F23R 3/58; F23R 2900/00015; F23R 2900/03341
See application file for complete search history.

(56) References Cited

U.S. PATENT DOCUMENTS 9,151,223 B2    10/2015    Negulescu
2014/0260305 A1  9/2014    Hobbs et al.

* cited by examiner

FIG. 9
FIG. 10
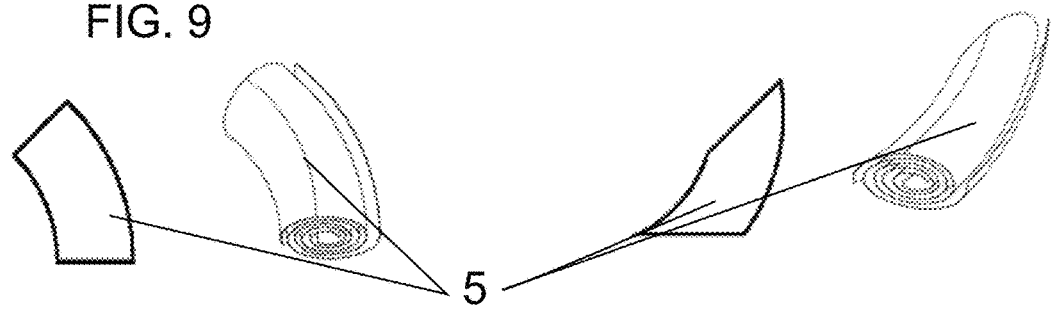
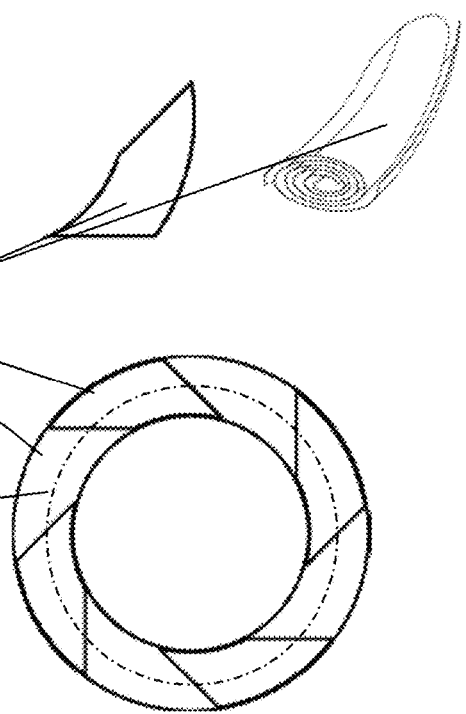
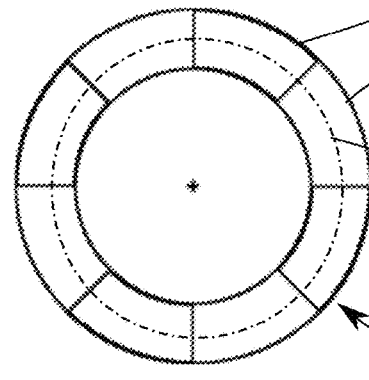
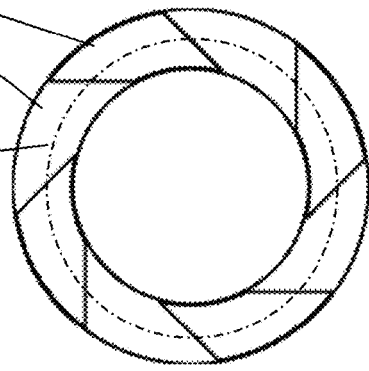
FIG. 11
FIG. 12
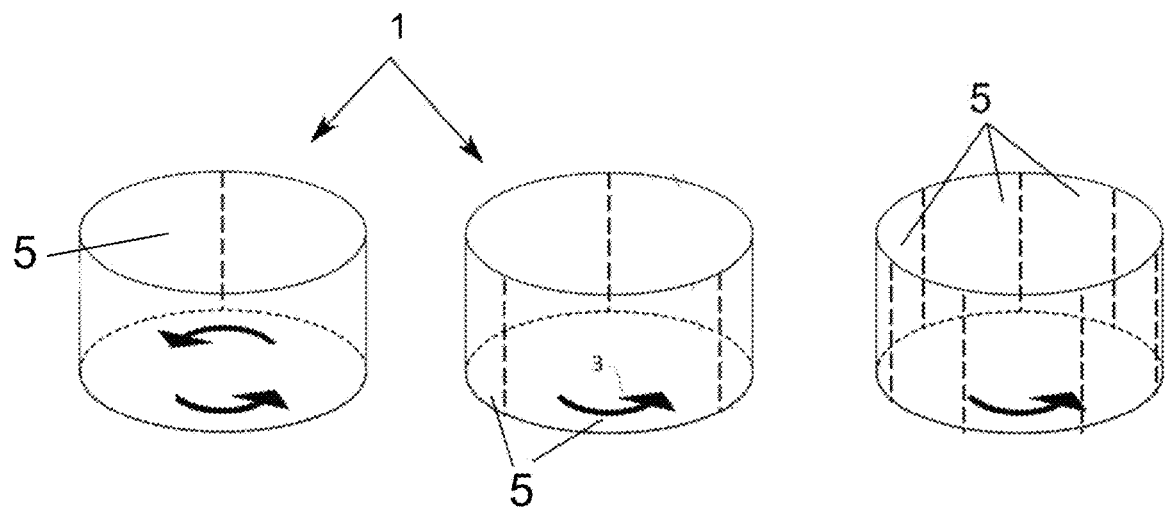
FIG. 13
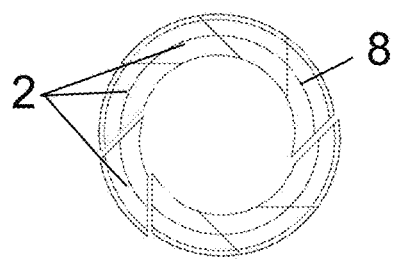
FIG. 14

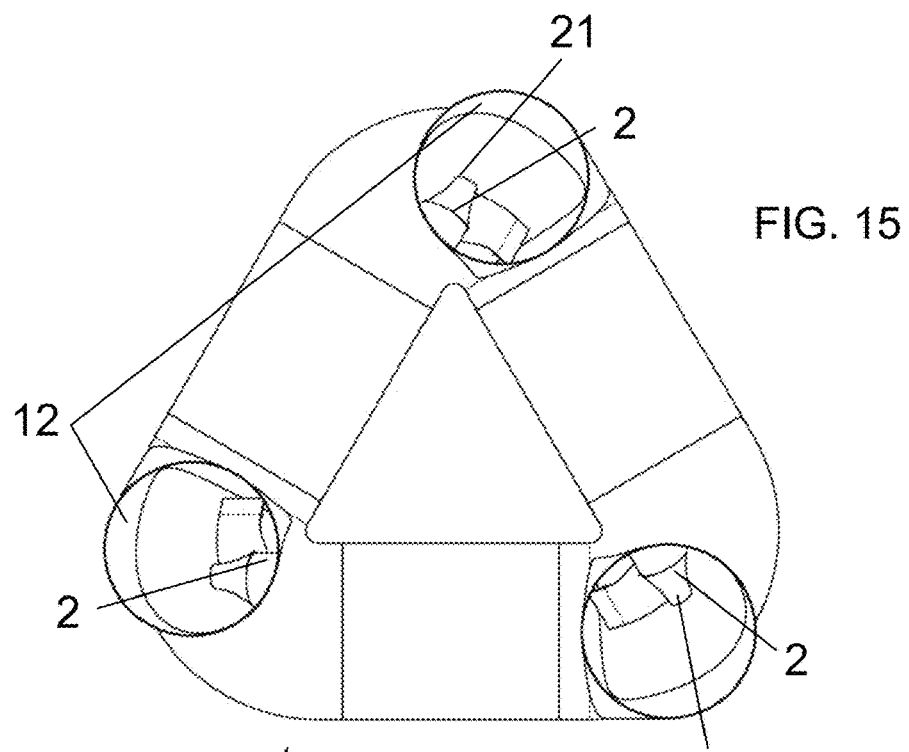
FIG. 15
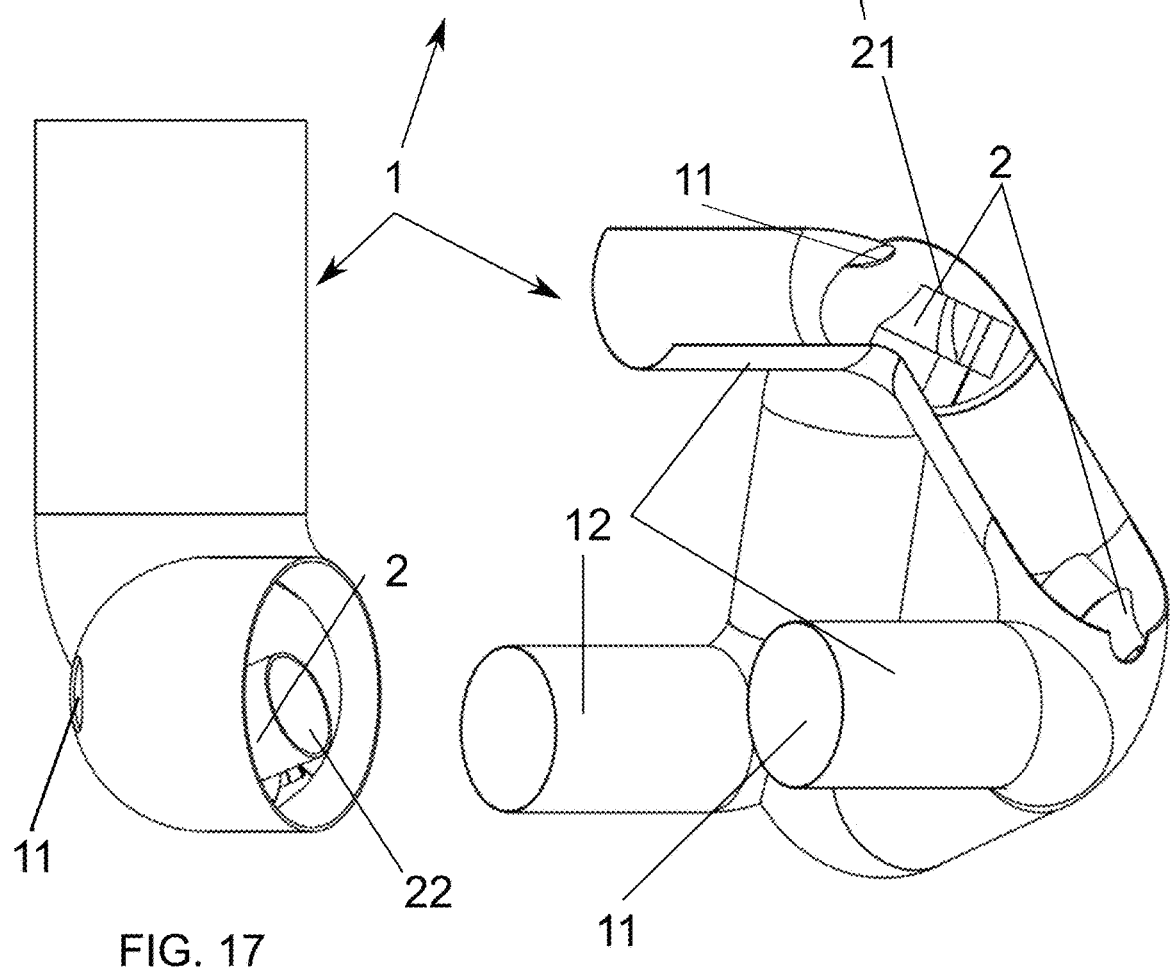
FIG. 17
FIG. 16

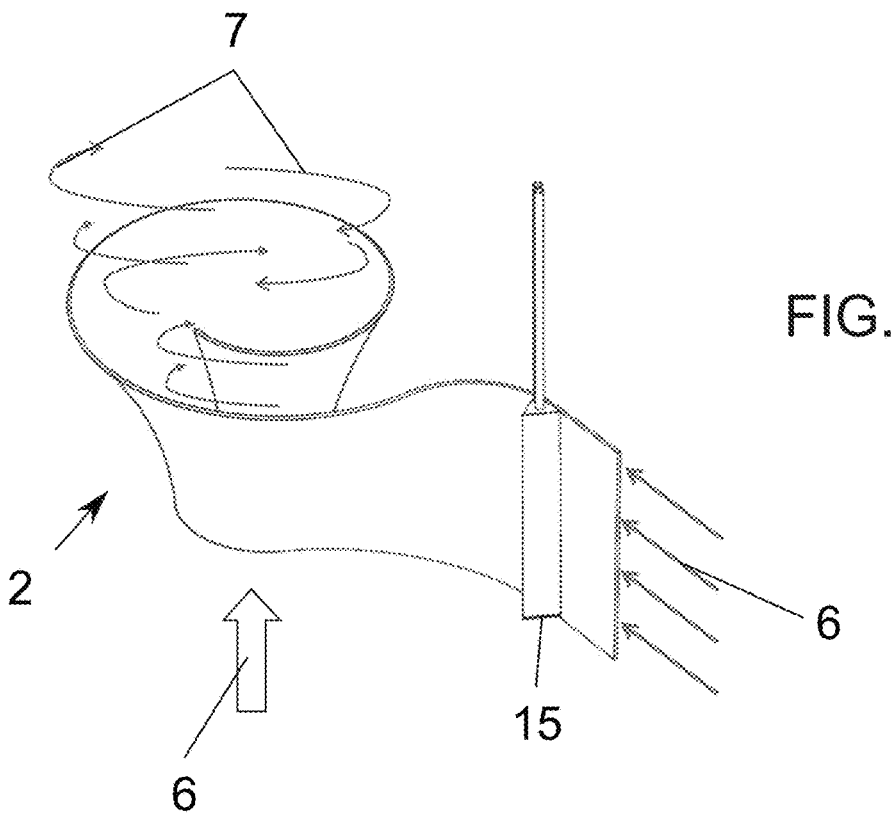
FIG. 18
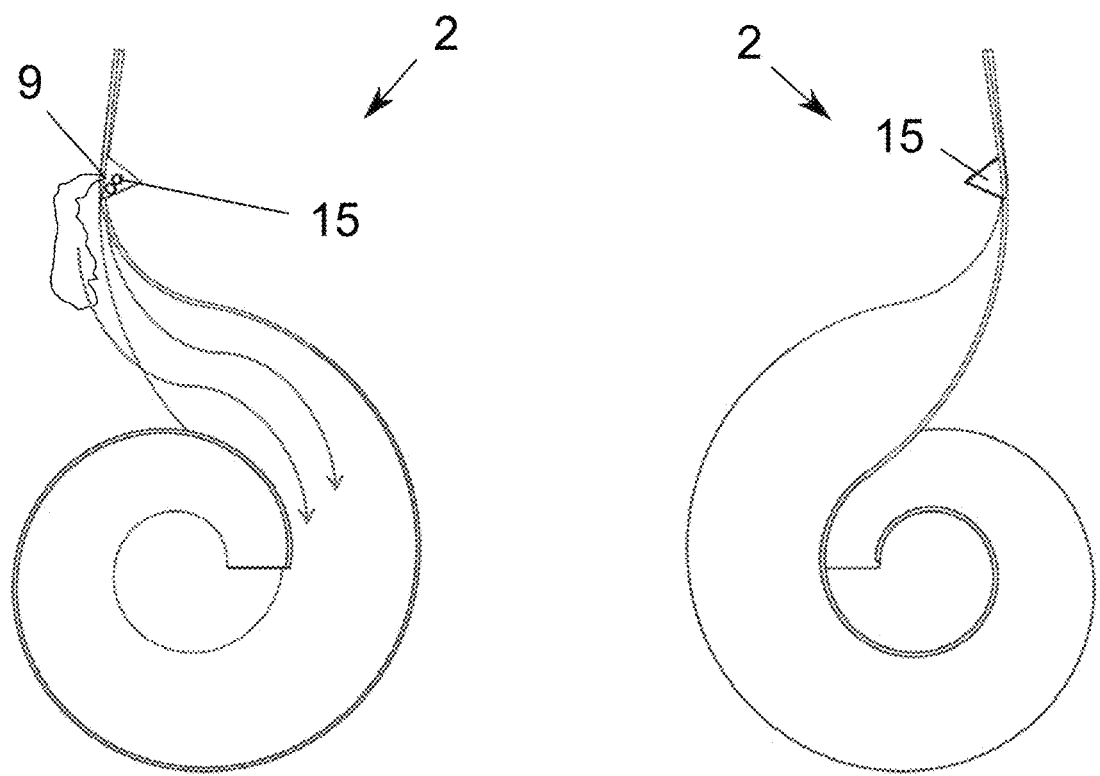
FIG. 19
FIG. 20

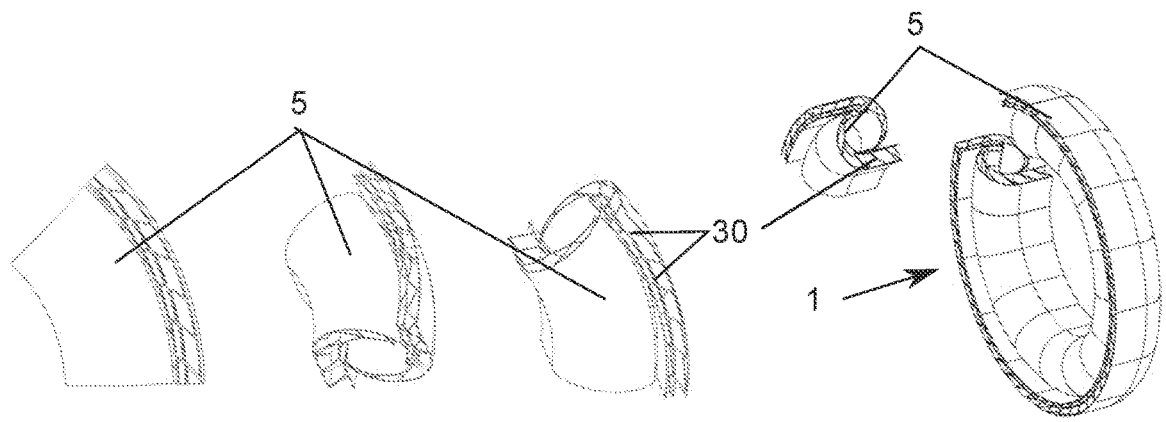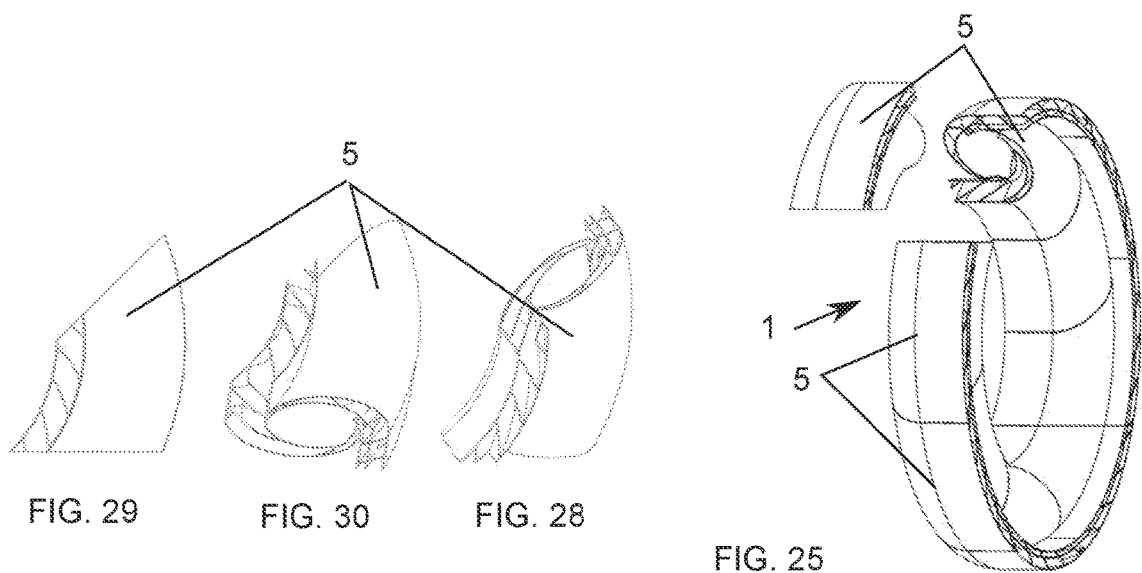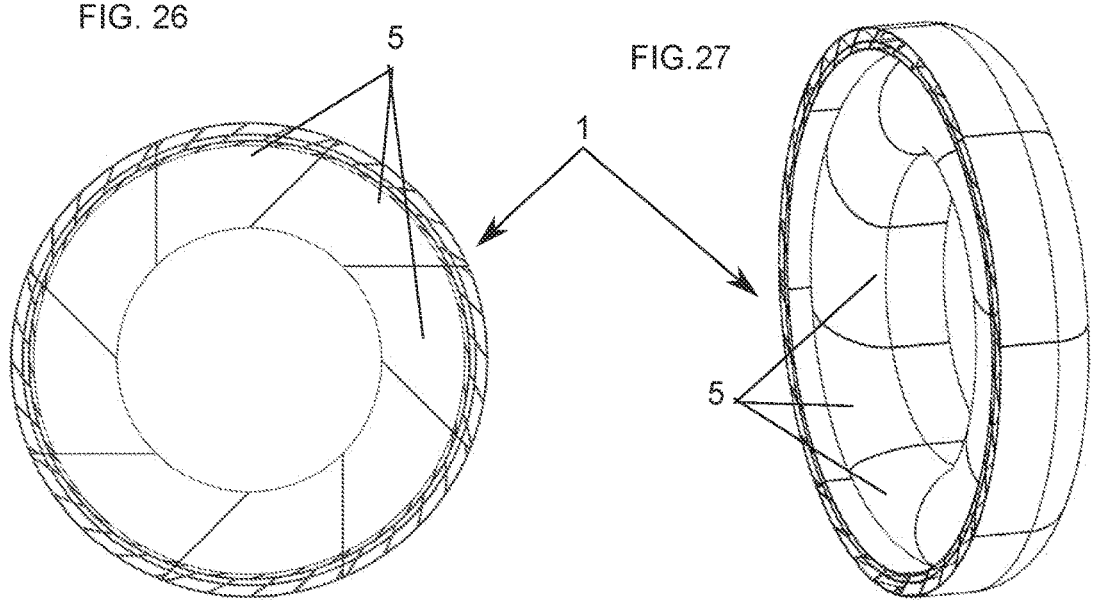

METHOD AND DEVICE FOR RECURSIVE SEQUENTIAL COMBUSTION

FIELD AND BACKGROUND OF THE INVENTION

The invention relates to a method for uniformly combusting fuel, according to the preamble of the independent method patent claim, and to a device for uniformly combusting fuel, according to the preamble of the independent device patent claim.

The invention relates to a gas burner, or a combustion chamber, as is used in gas turbines or engines, for example. Known from the prior art are, for example, aircraft turbines or gas turbines in which fuel is combusted in a burner which is disposed in a combustion chamber and is then supplied to a turbine, for example, or used for the propulsion of the aircraft.

The disadvantage of the engines and gas turbines known from the prior art lies in the fact that they generate a high degree of emissions, the fine particulate matter and the carbon-particulate matter contained in the exhaust gas in particular causing environmental damage. Furthermore, a high proportion of oxides of nitrogen (NOX) is generated in the exhaust gas, which promote the greenhouse effect or have a negative effect in terms of health and environment. In particular in aircraft engines there are currently no solutions for minimizing the oxides of nitrogen generated, or for binding or trapping the latter by a catalytic converter, as in automobiles, for example.

SUMMARY OF THE INVENTION

It is, therefore, the object of the present invention to provide a combustion for engines or gas turbines which is more environmentally friendly and enables lower emissions of oxides of nitrogen and can therefore be operated in a more environmentally friendly manner.

This object is achieved by the characterizing features of the independent method claim. It is provided according to the invention herein that the at least one burner is disposed, in particular, inclined, at an angle in relation to the primary flow direction of the fresh air flow in such a manner that part of the exhaust gas exiting the respective burner exit in the combustion chamber is imparted a tangential flow in relation to the primary flow direction and circulates in the combustion chamber, and enters the burner entry of the, in particular downstream, burner so as to be mixed with the fresh air flowing into the burner such that a recursive sequential combustion is achieved.

As a result of the configuration of the burners according to the invention, in particular of the disposal of the burners at an angle in relation to the primary flow direction of the fresh air flow, a tangential movement, or tangential flow, of the exhaust gases exiting the burners is achieved within the combustion chamber such that a proportion of the exhaust gases circulate within the combustion chamber. As a result of the exhaust gases circulating within the combustion chamber, part of the exhaust gases already exiting the burners are then fed to a further burner at the burner entry of the latter, and in this manner the already combusted exhaust gas is again mixed with fresh air and fed to a further combustion. According to the invention, a so-called recursive sequential combustion is achieved by these features, in which on the one hand owing to a dilution effect of the oxygen during the combustion of the latter to $CO_2$ and $H_2O$, and the combustion products $CO_2$ and $H_2O$ furthermore, absorb a certain proportion of heat, the formation of oxides of nitrogen being significantly reduced in such a manner. Furthermore, nitrogen monoxide that has been formed in the previous combustion further reacts with free OH groups so as to form nitrogen and water, for example. A further effect of the features according to the invention has been demonstrated in that fuel is saved and the efficiency of the combustion is increased as a result of the recursive combustion of the exhaust gases according to the invention. Furthermore, the formation of exhaust gases, for example carbon dioxide, oxides of nitrogen and carbon-particulate matter, is reduced because a so-called lean combustion can take place in the burners, thus permitting a longer path of the circulated exhaust gases in the combustion chamber and thus enabling a complete combustion and reduction of carbon-particulate matter. Particularly advantageous embodiments of the method according to the invention are defined in more detail by the features of the dependent claims:

In this way, it can be provided in one preferred embodiment according to the invention that the combustion chamber is configured in the form of an inherently closed, in particular toroidal or annular or loop-shaped flow duct in such a manner that a circular flow is configured in the combustion chamber, wherein it is provided in particular that the axis of the combustion chamber is disposed so as to be coaxial with the primary flow direction of the fresh air flow. By generating a circular flow within a flow duct in the combustion chamber, or the flow duct configured as a combustion chamber, it is achieved that the exhaust gases mix with the fresh air flow within the combustion chamber and in this manner the burners can be effectively supplied with a mixture of fresh air and exhaust gases.

In conjunction with the above-mentioned features, a flow duct is understood to mean that the exhaust gas flow, or the exhaust gas flow mixed with the fresh air, can be forcibly imparted an enforced flow within the combustion chamber, wherein the previously mentioned flow duct does not have to be configured solely in the physical shape of a duct but may alternatively also be configured by flow-directing elements.

It can preferably be provided that the combustion chamber has a number of sub-segments, in particular circle segments, wherein each sub-segment has in each case one burner, and wherein part of the exhaust gas generated by the respective burner is in each case directed into an adjacent sub-segment, and the remaining proportion of the exhaust gas is discharged from the combustion chamber by way of the combustion chamber exit.

A particularly simple embodiment of the method can be provided in that the combustion chamber has at least two burners, in particular a multiplicity of burners, which are disposed so as to be mutually sequential in such a manner that part of the exhaust gas of the upstream burner flows in each case into the burner entry of the respective burner, wherein the exhaust gas exiting the burner exit of the last burner flows into the burner entry of the first burner. In this way, the disposal of the burner at an angle in relation to the primary flow direction of the fresh air can for example take place such that part of the cross section of the burner exit of an upstream burner overlaps with the burner entry of a downstream burner and the exhaust gas of one burner can in this manner be supplied to the burner entry of the next burner that is downstream in the tangential direction, etc. In order to particularly advantageously obtain a stabilized flame, it can be provided that the burner is in particular configured so as to be helical and has a cross section in the form of a double spiral, wherein the fresh air, in particular mixed with part of the exhaust gas, at the burner entry of the burner is directed in a spiraliform manner into the center of the burner, wherein the fuel is injected by way of injection openings in the region of the center of the spiraliform burner and is combusted with the fresh air, and wherein the exhaust gas is directed in a spiraliform manner out of the center of the spiraliform burner to the burner exit. A particularly advantageous pressure loss within the burner is achieved as a result of the spiraliform configuration of the burner in the form of a double spiral, said pressure loss being a known value for the quality of fire tubes, which is in particular approx. 5% of the inlet pressure. Furthermore, as a result of the configuration of the burner in the form of a double spiral, an acceleration of the fresh air, or of the fresh air mixed with the exhaust gas is achieved at the burner entry as a result of the blockage of the path, or the spiraliform deflection, such that velocities of approx. 50 m/s along the wall can be achieved, for example. Furthermore, the high velocity of the fresh air advantageously prevents the flame from running back into the burner, or the burner entry, that is to say the flame is stabilized by the circulating air. This has the further advantages that the wall of the burner is cooled by the fresh air, on the one hand. The fresh air, or the fresh air mixed with the exhaust gas, is rapidly guided into the center of the burner, this furthermore advantageously causing swirling of the fresh air, of the exhaust gas and of the fuel to be combusted.

It can particularly advantageously be provided that the spiral axis of the burner extends at least along part of the cross-sectional axis, in particular along the entire cross-sectional axis, of the combustion chamber. In this way, the previously mentioned burner of double configuration can, for example, form the entire combustion chamber, for example in the form of an inherently closed doughnut. In this way, as a result of the configuration of the burner as a double spiral, a circular flow is achieved in the center of the spiral, said circular flow then generating a mixture of the already combusted exhaust gases and the fresh air and in this manner being able to effectively generate a recursive sequential combustion.

It can particularly advantageously be provided that the ratio, in particular the pulse flow ratio, between the fresh air entering the burner and the exhaust gas directed into the burner is between 1:1 and 20:1, in particular 2:1 and 10:1, particularly preferably is 5:1. In this case, the pulse flow ratio is the mass flow times the flow velocity divided by the cross-sectional area.

A further aspect of the present invention provides that a device for carrying out the method, or a device by way of which the method according to the invention can be easily carried out, is provided. It is furthermore an object to provide a device by way of which turbines and gas turbines can be operated in a more environmentally friendly manner. This object is achieved by the characterizing features of the independent device claim.

According to the invention it is provided herein that the at least one burner is disposed, preferably inclined, at an angle in relation to the primary flow direction of the device in such a manner that part of the exhaust gas exiting the respective burner exit in the combustion chamber is imparted a tangential flow in relation to the primary flow direction and circulates in the combustion chamber, and enters the burner entry of the, in particular downstream, burner so as to be mixed with the fresh air flowing into the burner such that a recursive sequential combustion is achieved.

As has already been described in the context of the method, a particularly effective combustion of the fuel is achieved as a result of the device according to the invention, such that the emission of gases, fine-particulate matter and carbon-particulate matter which are harmful to the climate or health is reduced and fuel can moreover be saved.

Particularly advantageous embodiments of the devices according to the invention are defined in more detail by the features of the dependent claims:

Accordingly, it is provided, for example, that the combustion chamber is configured in the form of an inherently closed, in particular toroidal or annular or loop-shaped flow duct in such a manner that a circular flow is configured in the combustion chamber, wherein it is provided in particular that the axis of the combustion chamber is disposed so as to be coaxial with the primary flow direction of the device. As a result of the configuration of the combustion chamber in the form of an inherently closed structure, in particular an annular, loop-shaped flow duct, a circular flow within the combustion chamber can be particularly effectively achieved such that the fresh air entering the combustion chamber can be simply and particularly effectively achieved with the exhaust gases of the fuels already combusted by the burner. In the context of the invention, the term flow duct is not to be understood to be limiting in such a manner that only a closed structure can serve as a so-called flow duct, but rather can be understood to mean any arbitrary configuration of the combustion chamber which permits a defined flow to be generated. Accordingly, the combustion chamber can be configured so as to be closed, for example, or else configured so as to be open, as long as a so-called circular flow, thus a flow of at least part of the exhaust gas transverse to the axis of the fresh air flow, or transverse to the primary flow direction of the fresh air flow, in the combustion chamber, can be generated.

It can preferably be provided that the combustion chamber has a number of sub-segments, in particular circle segments, wherein each sub-segment comprises in each case one burner, and wherein the combustion chamber is configured in such a manner that part of the exhaust gas generated by the respective burner, in particular by means of the combustion chamber configured as a flow duct or by means of flow-directing elements, is in each case able to be directed into an adjacent sub-segment, and the remaining proportion of the exhaust gas is able to be discharged from the combustion chamber by way of the combustion chamber exit.

A particularly preferred embodiment can be provided in that the combustion chamber has at least two burners, in particular a multiplicity of burners, which are disposed so as to be mutually sequential in such a manner that part of the exhaust gas of the upstream burner flows in each case into the burner entry of the respective downstream burner, wherein the exhaust gas exiting the burner exit of the last burner flows into the burner entry of the first burner.

In a disposal of this type of a plurality of burners, the upstream burner by way of the burner exit thereof can overlap a region of the burner entry of the downstream burner, for example, such that the exhaust gases exiting the first burner can easily be supplied to the second burner, or the burner downstream of said first burner, respectively.

It can particular preferably be provided that the burner is in particular configured so as to be helical and has a cross section in the form of a double spiral, wherein the burner is configured to be spiraliform in such a manner that the fresh air, in particular mixed with part of the exhaust gas, at the burner entry of the burner is able to be directed in a spiraliform manner into the center of the burner, wherein the fuel is able to be injected by way of injection openings in the region of the center of the spiraliform burner and is able to be combusted with the fresh air, and wherein the exhaust gas is able to be directed in a spiraliform manner out of the center of the spiraliform burner to the burner exit.

As has already been mentioned in the context of the method, the preferred configuration of the burners in the form of a double spiral can advantageously be utilized to achieve a particularly effective combustion and mixing of the fresh air and the exhaust gases, and to furthermore particularly preferably generate the velocity profiles and pressure ratios within the burner.

To this end, it is provided in particular that the spiral axis of the burner extends at least along part of the cross-sectional axis, in particular along the entire cross-sectional axis, of the combustion chamber. As a result of the configuration of the spiraliform burner, or of the entire combustion chamber, in the form of a double spiral, a particularly advantageous circular flow in the center of the double spiral is achieved, as a result of which the circulation of the exhaust gases within the center of the burners configured in the form of a double spiral, or of the combustion chamber configured in the form of a double spiral, is achieved.

In one preferred embodiment it can be provided that an engine, or a gas turbine, comprises a device according to the invention.

Further advantages and embodiments of the invention are derived from the description and the appended drawings.

The invention is schematically illustrated by means of particularly advantageous exemplary embodiments in the drawings, which are not to be understood to be limiting, and will be described in an exemplary manner with reference to the drawings hereunder, in which:

BRIEF DESCRIPTION OF THE FIGURES

FIG. 4 shows a schematic view having a plurality of sub-segments according to;

FIGS. 9 to 12 show embodiments of the device according to the invention with different configurations of the sub-segments;

FIG. 13 shows a schematic view of the circular flow with different sub-segments;

FIG. 14 shows a further embodiment of potential sub-segments;

FIGS. 15 to 17 show an embodiment of the combustion chamber having three burners; and FIG. 18 shows an exemplary embodiment of a burner according to the invention which is configured as a cyclone, or a mixing chamber of a burner, which is configured as a swirl generator in the form of a cyclone;

FIG. 19 shows a view from above onto the cyclone from FIG. 18;

FIG. 20 shows a view of the cyclone from FIG. 19 from below; and

FIGS. 21-30 show alternative embodiments of the schematic representation of FIGS. 9-14 with a combustion chamber having differently designed sub-segments.

DETAILED DESCRIPTION OF THE INVENTION

Figure 1:
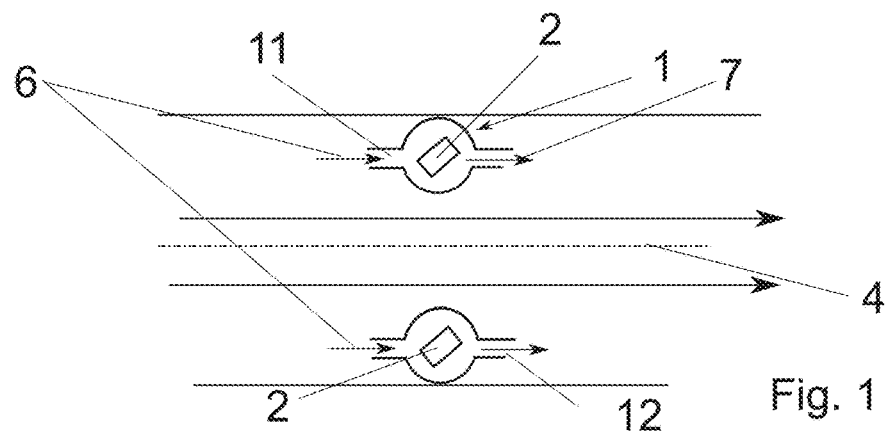
FIG. 1 shows a first embodiment of the device according to the invention in a schematic view.

A first embodiment of the device according to the invention is illustrated in a schematic view in FIG. 1. The device comprises a combustion chamber 1 which is disposed within the device, for example an engine or a gas turbine. Fresh air 6 is directed along a primary flow direction 4 through the device, wherein a proportion of the fresh air 6 flows into the combustion chamber 1 by way of a combustion chamber entry 11. A number of burners 2 are disposed in the combustion chamber 1, in which the fresh air 6 is supplied to the burner 2 by way of a burner entry 21. The fresh air 6 is combusted with fuel in the burner 2. The combusted fuel then exits the burner 2 as exhaust gas 7 at the burner exit 22. The burners 2 here are disposed so as to be inclined at an angle in relation to the primary flow direction 4 of the fresh air flow 6, or of the device, in such a manner that part of the exhaust gas 7 exiting the respective burner exit 22 in the combustion chamber 1 is imparted a tangential flow in relation to the primary flow direction 4 and circulates in the combustion chamber 1. In this manner, the exhaust gases 7 circulating within the combustion chamber 1 are mixed with the inflowing fresh air 6 and directed again into the burner entry 21 of a burner 2, or of the one burner 2. Part of the combusted exhaust gas 7 flows out of the combustion chamber 1 by way of the combustion chamber exit 12 and is supplied to a turbine for further processing, for example. By mixing the exhaust gases 7 exiting the burner exit 22 and the fresh air 6 flowing into the burner 2, and by re-supplying the fresh air 6 mixed with the exhaust gas 7, a so-called recursive sequential combustion is achieved, in which the formation of oxides of nitrogen is reduced and fine-particulate matter or carbon-particulate matter are further combusted such that a low-emission combustion which is more environmentally friendly is caused.

Figure 2:
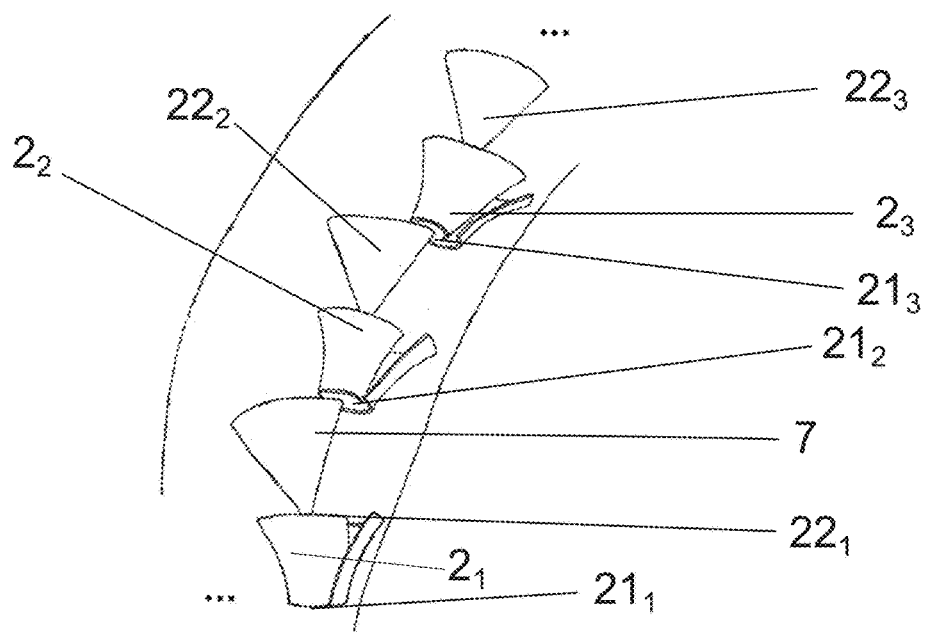
FIG. 2 shows a simplified embodiment of a burner assembly according to FIG. 1.

FIG. 2 shows a schematic assembly of a plurality of burners 2. The burners 2 in terms of the primary flow direction 4 are inclined at an angle in relation to the latter such that the exhaust gas 7 flowing out of the upstream burner 21 in each case enters the burner entry 212 of the second burner 22, is again mixed with fresh air 6 in the latter, and is further combusted. The exhaust gas 7 exiting the second burner 22 is again partially supplied to the downstream burner 23 of the latter and therein, mixed with fresh air 6, combusted again. The embodiment illustrated in FIG. 2 causes a partial overlap of the burner exit $22_n$ of a respective burner $2_n$ with the burner entry $21_{n+1}$ of the downstream burner $2_{n+1}$, such that part of the exhaust gas 7 is in each case supplied to the downstream burner $2_{n+1}$. Furthermore, a circular flow of the exhaust gases 7 within the combustion chamber 1 is achieved as a result of this assembly, such that said exhaust gases 7 can simply be supplied to the downstream burners $2_{n+1}$, or supplied to recursive combustion again.

Figure 3:
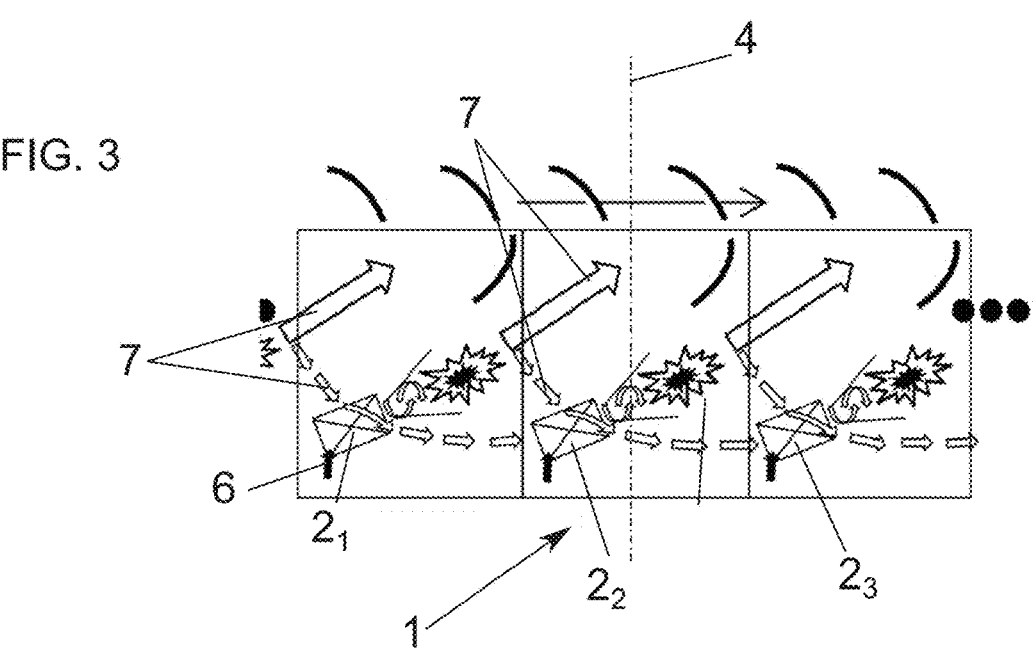
FIG. 3 shows a second embodiment of a device according to the invention in a schematic illustration.

FIG. 3 shows a further embodiment of the device according to the invention in a schematic view. The burners 2 are in each case inclined at an angle in relation to the primary flow direction 4, or disposed at an angle, such that part of the exhaust gases within the combustion chamber 1 are imparted a tangential flow and supplied to the respective downstream burners 2, so as to in this manner again achieve a recursive sequential combustion. The combustion chamber 1 in the embodiments illustrated in FIGS. 1 to 3 is configured as a flow duct, whereby the term flow duct is not to be understood as limiting but only as to mean that part of the exhaust gas 7 can circulate within the combustion chamber 1 as a result of the configuration of the combustion chamber 1, or of the combustion chamber 1 configured as a flow duct. This can be achieved, for example as illustrated in FIG. 2, by a fixed flow duct which is delimited by walls or, as illustrated in FIG. 3, by baffles or guide vanes, for example, which deflect the flow of exhaust gas and force the latter to perform a circulating flow.

Figure 4:
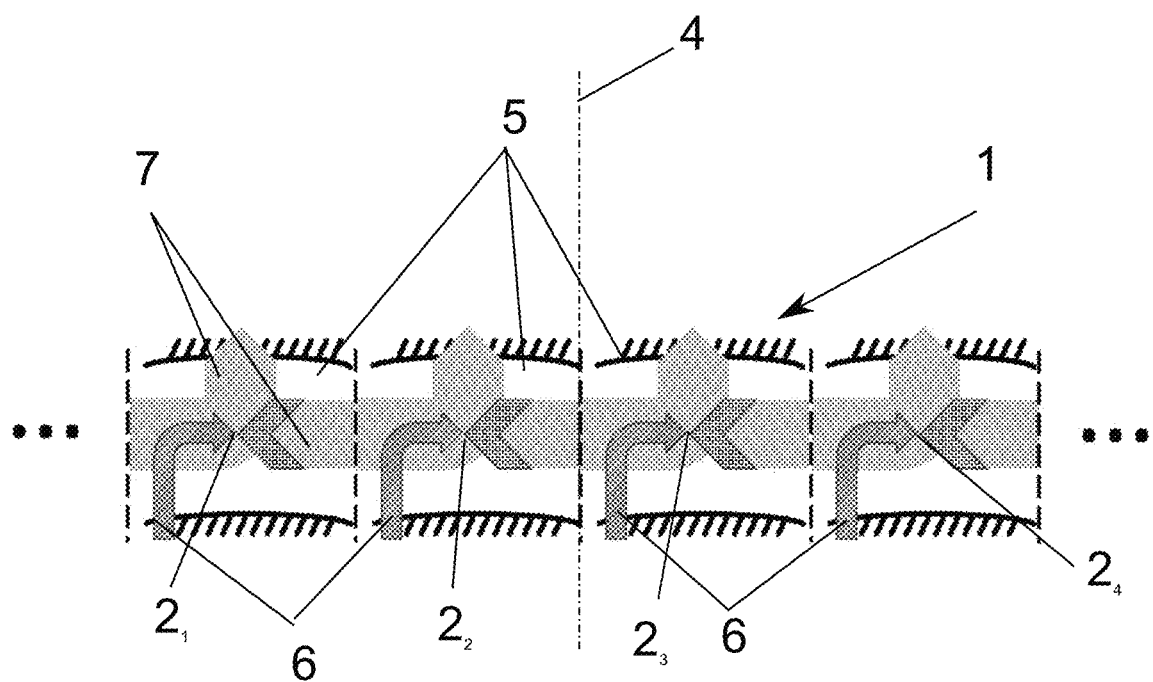
Figure 5:
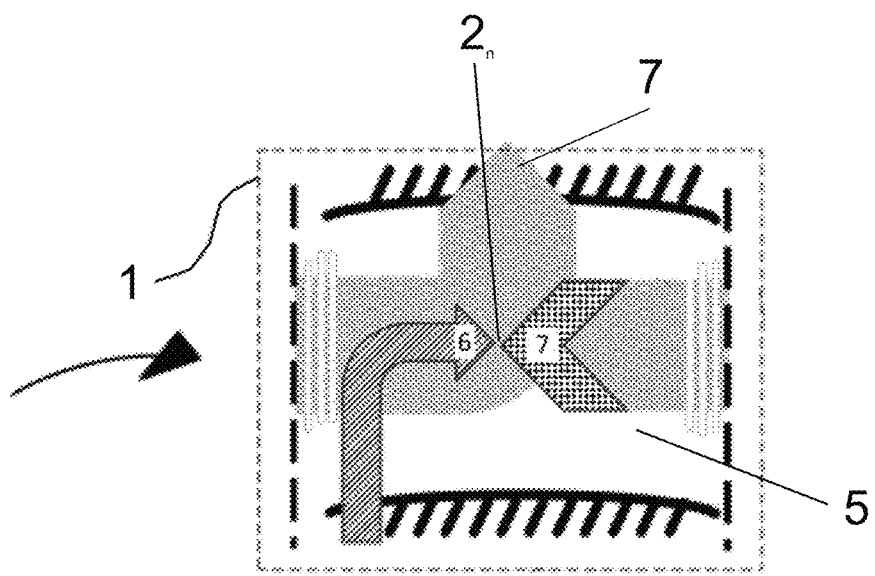
FIG. 5 shows a schematic view of a sub-segment of the combustion chamber of FIG. 4.

A further embodiment of the device according to the invention is illustrated in a schematic view in FIGS. 4 and 5. The combustion chamber 1 is configured as a toroidal, inherently closed flow duct. The axis of the toroidal combustion chamber 1 lies so as to be coaxial with the primary flow direction 4 of the fresh air flow 6 within the device, such that the combustion chamber 1 is disposed in the primary flow direction 4 of the fresh air flow 6 within the device. The combustion chamber 1 has a number of sub-segments 5, four sub-segments 5 in the embodiment illustrated in FIG. 5, which are disposed next to one another in the direction of the primary flow direction 4. FIG. 5 shows the toroidal combustion chamber 1 in the developed form so that the four sub-segments 5 are depicted in a two-dimensional manner. FIG. 4 shows the fresh air flow 6 which enters the combustion chamber 1 by way of the combustion chamber entry 11 and enters a sub-segment 5. Disposed in the sub-segments 5 of the combustion chamber 1 is a burner 2, not illustrated, in which the fresh air 6 is combusted with fuel such that exhaust gas 7 exits the burner 2. As a result of the toroidal configuration of the combustion chamber 1, and of the disposal of the burners 2 at an angle in relation to the primary flow direction of the fresh air flow 6, or of the device, the exhaust gas 7 is circulated within the combustion chamber 1 such that part of the exhaust gas 7 is in each case directed to the downstream sub-segment 5, and in the latter with a burner 2 is again combusted with the fresh air 6 (FIG. 5) entering the sub-segment 5. Part of the exhaust gases 7 are then moved out of the combustion chamber 1 by way of the combustion chamber exit 12 and supplied to further processing. By mixing the exhaust gases 7 with the fresh air 6, only part of the exhaust gases 7 are in each case circulated within the combustion chamber 1 such that exhaust gases 7 mixed with fresh air 6 can be supplied to the respective further processing in a burner 2.

As is illustrated in FIGS. 4 and 5, the combustion chamber 1 thus has a plurality of burners $2_n$ which are disposed so as to be mutually sequential in such a manner that part of the exhaust gas 6 of the upstream burner $2_n$ flows in each case into the burner entry $21_{n+1}$ of the respective downstream burner $2_{n+1}$. The exhaust gas 7 exiting the last burner $2_{n+x}$ in FIG. 5 then enters the burner entry $21_n$, in the embodiment illustrated in FIG. 5 the burner entry 211, of the initial or first burner $2_n$.

Figures 6, 7, 8:
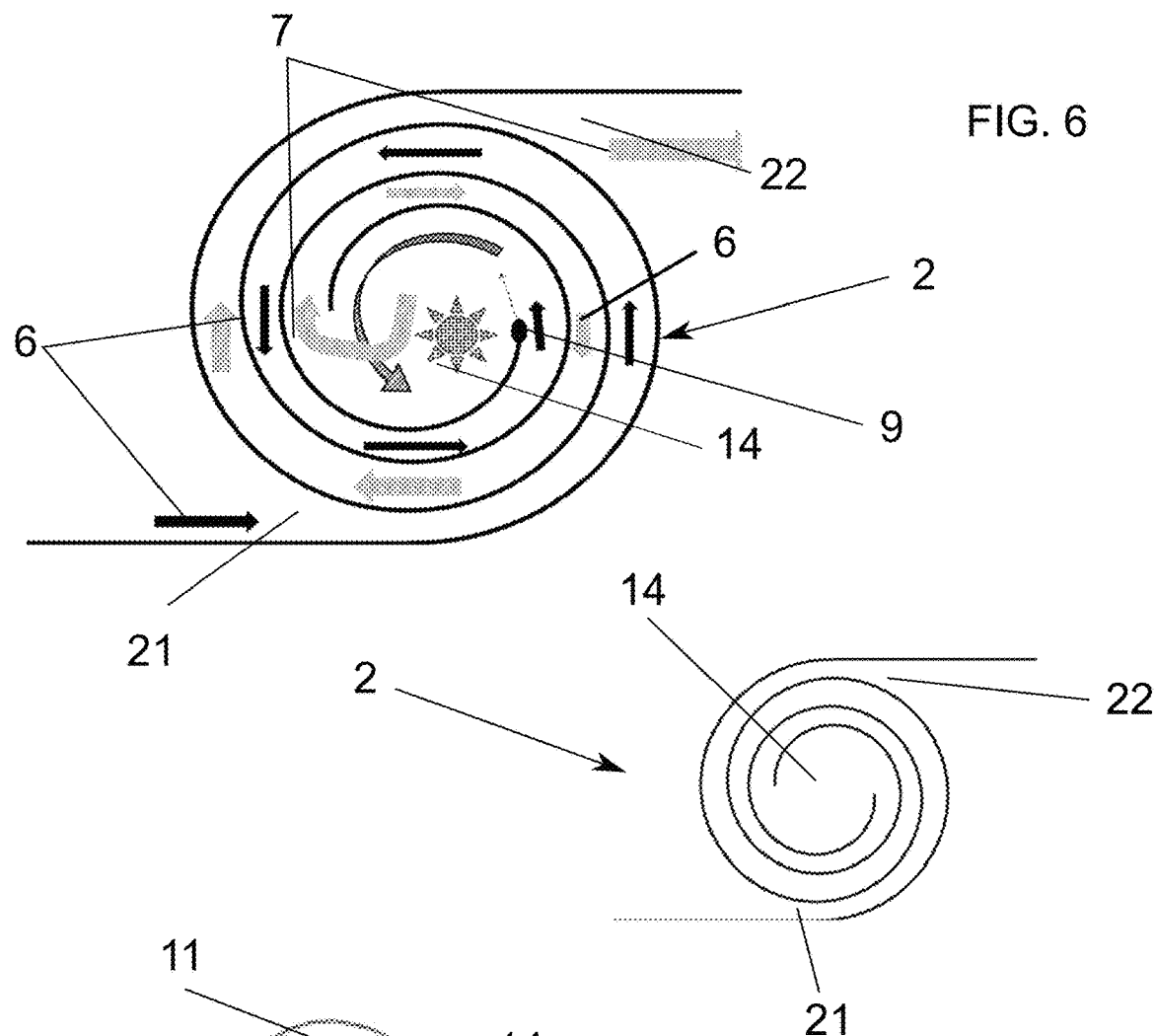
FIG. 6 shows an embodiment of the burner as a double spiral.
FIG. 7 shows a schematic illustration of the flow states within the burner configured as a double spiral.
FIG. 8 shows a preferred embodiment of the combustion chamber as a double spiral.

A preferred embodiment of the burners 2 is illustrated in a schematic view in FIGS. 6 and 7. The burner 2 is configured in the form of a double spiral, wherein the cross section of the burner 2 is of a double-spiral configuration. One spiral runs in the direction of the center 14 of the spiral, and the second from the center 14 of the first spiral outward, so as to be coaxial with the latter. The fresh air 6 enters the burner 2 by way of the burner entry 21 of the latter and in a spiraliform manner runs in the direction of the center 14 of the burner 2. In the center of the burner 2, fuel is introduced into the burner 2 by way of injection openings 9 and combusted with the fresh air 6. The exhaust gas 7 then runs in a spiraliform manner out of the center 14 of the burner 2, and then flows out of the burner 2 and the burner exit 22. As a result of the spiraliform disposal of the burner 2, the fresh air 6 is preheated by the outflowing exhaust gases 6, or the wall of the burner 2 is cooled by the cool inflowing fresh air 6, respectively. As a result of the deflection within the burner 2 of spiraliform configuration, the fresh air 6 entering the burner entry 21 is compressed and accelerated such that a particularly advantageous velocity and pressure profile is configured within the spiraliform structure.

As is illustrated in FIG. 8, the combustion chamber 1 can be completely configured as a double-spiraliform structure, wherein the fresh air 6 flows in by way of the combustion chamber entry 11, is deflected in a spiraliform manner into the center 14 of the combustion chamber 1, and fuel can be combusted with the fresh air 6 in the center 14 by way of injection openings 9 disposed in a punctiform manner. Part of the exhaust gases 6 then circulate in the center 14 of the spiral and are in this way supplied to a further combustion in each case. Part of the exhaust gases 6, by way of the spiraliform structure of the combustion chamber 1, then flows back in the direction of the combustion chamber exit 12 and therein is delivered for further use in the device.

As is illustrated in FIGS. 9 to 12, the combustion chamber 1 can be constructed from dissimilar sub-segments 5, wherein one sub-segment 5 may for example have in each case a burner 2 (FIG. 9) of double-spiraliform configuration as described in the context of FIG. 7. The spiral axis of the burner 2, or the cross section of the burner 2, can then extend across part of the cross-sectional axis 8 of the combustion chamber 1 configured as a flow duct, as is illustrated in FIGS. 9 and 11.

Alternatively, the burner 2 can also be of a banana-shaped configuration and extend along a portion of the sub-segment 5, as is illustrated in FIGS. 10 and 12, such that dissimilar downstream flow angles of the exhaust gas 7 into the dissimilar sub-segments 5 of the burner 2 can be achieved as a result of the distortion of the spiral axis of the burner 2.

As is illustrated in FIG. 13, the combustion chamber 1 can be formed by a single segment such that the exhaust gas 7 of a single burner 2 is in each case resupplied to the latter, a circular flow of the exhaust gas 7 being able to be achieved by single burner 2 as a result. FIG. 13 furthermore shows the possibility of combining different numbers of sub-segments 5 with one another, wherein one burner 2 can be disposed in each sub-segment 5.

An optional embodiment of dissimilar burners 2 is illustrated in FIG. 14, wherein the burners 2 in the embodiment illustrated in FIG. 14 have in each case a double-spiraliform cross section and extend along the cross-sectional axis 8 of the toroidal combustion chamber 1 and are disposed behind one another. As is illustrated in FIG. 14, the burners 2 can in each case be directly adjacent to one another such that the burner exit $22_n$ of a burner $2_n$ is disposed so as to be congruent with the burner entry $21_{n+1}$ of the downstream burner $2_{n+1}$, or a spacing between the individual burners 2 is in each case provided.

To that extent, an advantageous embodiment of a combustion chamber 1 with sub-segments is illustrated in FIG. 21-24. The sub-segments 5 and the combustion chamber 1 are produced by 3D printing and have a structure which is particularly light and easy to produce. The support structures 30 of the combustion chamber 1 make it possible to easily produce the structure without requiring much material. Furthermore, the support structures 30 can be adjusted according to the forces occurring in the combustion chamber 1.

Corresponding to FIGS. 11-14, FIGS. 25-30 show different embodiments of the combustion chamber 1 and the sub-segments 5. The sub-segments 5 can in this case extend in a curved manner or, in different embodiments, along the spiral axis 8 of the combustion chamber 1.

A further embodiment of the device according to the invention is illustrated in three different views in FIGS. 15 to 17. The combustion chamber 1 is configured as a triangular flow duct, one burner 2 being in each case disposed in the corners of the triangular combustion chamber 1. Fresh air 6 enters the combustion chamber 1 by way of the three combustion chamber entries 11, is supplied to the respective burners 2, and in the latter combusted with fuel. The exhaust gas 7 exiting the respective burners 2 is then circulated along the combustion chamber 1, through the burners 2 which are inclined in relation to the axis of the primary flow direction 4 of the fresh air, and within the combustion chamber 1 configured as a flow duct, such that the exhaust gas 6 is mixed with the fresh air 7 and supplied to the respective downstream burners 2. As a result of the embodiment illustrated in FIGS. 15 to 17, a circular flow of the exhaust gases 7 as is illustrated in FIG. 17 is achieved in a simple manner, such that a recursive sequential combustion of the exhaust gases 7 can take place in a particularly simple manner. Part of the exhaust gases 7 exit the combustion chamber exit 12 such that part of the exhaust gases 7 mixed with the fresh air 6 circulate in each case within the combustion chamber 1.

Further optimization of the combustion of fuel mixed with oxidizing agents can optionally be achieved in a burner 2 according to the invention, as is illustrated in FIGS. 18 to 20, when the burner 2 is configured as a cyclone. Detailed views of a cyclone of this type, for example for power generation machinery, such as stationary gas turbines or industrial burners, are illustrated in FIGS. 18 to 20.

Page 5—information pertaining to FIG. 18. This form of burner is particularly suitable.

As can be seen in FIGS. 18 to 20, a burner nozzle 15 having an injection opening 9 is in each case disposed at the inlet of the cyclone, and the air flow 6 or oxidizing agents make its/their way tangentially into the cyclone, this being indicated by the arrows at the inlet of the cyclone. Once the fresh air 6 flows into the cyclone, said fresh air 6 is directed axially out of the cyclone, as can be seen in FIGS. 18 and 20. The burner nozzle 15 is located within this air swirl such that the air swirl entrails the injected fuel droplets. This leads to preliminary mixing of air or oxidizing agents and fuel by swirling, and to air routing or air splitting. The positive mixing of air and fuel droplets prior to entering the combustion chamber leads to an even more uniform combustion in which fewer gas emissions are created. As a result of this embodiment, particularly advantageous, radially introduced mixing between the fresh air, the exhaust gases and the fuel is achieved, and particularly advantageous swirling is caused. Furthermore, a depression is caused by the swirling, which is achieved for suctioning the exhaust gas 7 circulating in the combustion chamber 1 into the burner entry 11.

As an alternative to the embodiments illustrated in FIGS. 1 to 20, the combustion chamber 1 can also have other configurations, for example be configured so as to be hexagonal, octagonal and also oval, wherein it is only necessary that a circular flow of the exhaust gases 7 mixed with the fresh air 6 is achieved within the combustion chamber 1. Alternatively, the combustion chamber 1 can also be in the form of a ring, in the form of an inherently closed loop, or have cross-sectional shapes other than those shown.

The device according to the invention illustrated in FIGS. 1 to 20, or the method according to the invention can be used in gas turbines or aircraft engines, for example, wherein the application of the method according to the invention is not limited to these types of application but may also be used in for example other aircraft or helicopter turbines, propeller engines, or other devices in which fuel is combusted.

A particularly suitable production of the burners shown in FIG. 1 to 20 is achieved by additive manufacturing.

The invention claimed is:

1. A method for a uniform recursive sequential combustion of fuel and an oxidizing agent in a combustion chamber of an engine or a gas turbine, the method comprising:
    directing compressed fresh air, with the compressed fresh air being the oxidizing agent, through the combustion chamber along a primary flow direction, wherein the compressed fresh air flows in by way of a combustion chamber entry and flows out by way of a combustion chamber exit;
    supplying a proportion of the compressed fresh air to at least one burner by way of a burner entry and in the at least one burner the compressed fresh air is combusted with the fuel and subsequently exits the at least one burner as exhaust gas at a burner exit; and
    disposing the at least one burner at an oblique angle in relation to an axial direction defined along an axis of the combustion chamber, wherein the primary flow direction of the compressed fresh air from the combustion chamber entry to the combustion chamber exit is substantially coaxial with the axis of the combustion chamber such that part of the exhaust gas exiting the burner exit in the combustion chamber is imparted a tangential flow in relation to the primary flow direction, circulates in the combustion chamber, and enters the burner entry of a first burner of the at least one burner, the burner entry of the first burner being offset, in a circumferential direction perpendicular to the axial direction, from the burner exit from which the part of the exhaust gas exited, so as to be mixed with compressed fresh air flowing into the burner entry of the first burner such that recursive sequential combustion is achieved.

2. The method according to claim 1, wherein the combustion chamber is configured in a form of a closed flow duct such that a circular flow is generated in the combustion chamber.

3. The method according to claim 1, wherein the combustion chamber has a plurality of sub-segments, wherein each of the sub-segments has a respective burner, and wherein part of the exhaust gas generated by each respective burner is directed into an adjacent one of the sub-segments, and a remaining proportion of the exhaust gas is discharged from the combustion chamber by way of the combustion chamber exit.

4. The method according to claim 1, wherein the at least one burner comprises a plurality of burners which are disposed so as to be mutually sequential such that part of the exhaust gas of an upstream first burner of the plurality of burners flows into the burner entry of a downstream burner of the plurality of burners, wherein the exhaust gas exiting the burner exit of a downstream last burner of the plurality of burners flows into the burner entry of the upstream first burner.

5. The method according to claim 1, wherein the at least one burner comprises a helical burner having a cross section in a form of a double spiral, wherein the compressed fresh air at the burner entry of the at least one burner is directed along a spiraliform flowpath into a center of the at least one burner, wherein the fuel is injected by way of injection openings in a region of the center of the at least one burner, and wherein the exhaust gas is directed along a spiraliform flowpath out of the center to the burner exit.

6. The method according to claim 5, wherein a spiral axis of the at least one burner extends at least partially along a cross-sectional axis of the combustion chamber.

7. The method according to claim 1, wherein a ratio between the compressed fresh air entering the at least one burner and the exhaust gas directed into the at least one burner is between 1:1 and 20:1.

8. The method according to claim 2, wherein the closed flow duct is a toroidal-shaped flow duct, an annular-shaped flow duct, or a loop-shaped flow duct.

9. The method according to claim 3, wherein the sub-segments are circle segments.

10. A device for providing recursive sequential combustion of fuel and an oxidizing agent, the device comprising:
   a combustion chamber having a combustion chamber entry and a combustion chamber exit, wherein compressed fresh air is the oxidizing agent and is conveyed into said combustion chamber via said combustion chamber entry, along a primary flow direction of the compressed fresh air through said combustion chamber from said combustion chamber entry to said combustion chamber exit, the compressed fresh air conveyed out of said combustion chamber by way of said combustion chamber exit; and
   said combustion chamber having burners, each burner comprising at least one injection opening, a burner entry and a burner exit, wherein a proportion of the compressed fresh air is supplied by way of said burner entry, wherein the fuel introduced by way of said at least one injection opening is combusted in each respective burner and exhaust gas from each respective burner is discharged from each respective burner at each respective burner exit, wherein each respective burner is disposed at an oblique angle in relation to an axial direction defined along an axis of the combustion chamber, wherein the primary flow direction of the compressed fresh air is substantially coaxial with the axis of the combustion chamber, such that part of the exhaust gas exiting each respective burner exit in said combustion chamber is imparted a tangential flow in relation to the primary flow direction, circulates in said combustion chamber, and enters a burner entry of a downstream burner of said burners so as to be mixed with the compressed fresh air flowing into the downstream burner such that recursive sequential combustion is achieved during operation of the device.

11. The device according to claim 10, wherein said combustion chamber is configured in a form of a closed flow duct such that a circular flow is generated in said combustion chamber.

12. The device according to claim 10, wherein said combustion chamber has a plurality of sub-segments, wherein each of said sub-segments has a respective burner of said burners, and wherein said combustion chamber is configured such that part of the exhaust gas generated by said respective burner is directed into an adjacent one of said sub-segments, and a remaining proportion of the exhaust gas is discharged from said combustion chamber by way of said combustion chamber exit.

13. The device according to claim 10, wherein at least two of said burners are disposed so as to be mutually sequential such that part of the exhaust gas of a first upstream burner of said at least two burners flows into said burner entry of a downstream burner of said at least two burners, wherein the exhaust gas exiting the burner exit of a last burner of said at least two burners flows into said burner entry of said first upstream burner.

14. The device according to claim 10, wherein at least one of said burners is a helical burner having a cross section in a form of a double spiral, wherein said at least one of said burners is configured to be spiraliform such that the compressed fresh air, mixed with part of the exhaust gas, at said burner entry of said at least one of said burners is directed along a spiraliform flowpath into a center of said at least one of said burners, wherein the fuel is injected by way of injection openings in a region of said center and is combusted with the compressed fresh air, and wherein the exhaust gas is directed along a spiraliform flowpath out of said center to said burner exit.

15. The device according to claim 14, wherein a spiral axis of said at least one of said burners extends at least partially along a cross-sectional axis of said combustion chamber.

16. The device according to claim 10, wherein at least one of said burners is configured as a swirl generator, a turbulence generator or a cyclone.

17. An engine, comprising: the device according to claim 10.

18. A gas turbine, comprising: the device according to claim 10.

* * * * *